No. 689,522. Patented Dec. 24, 1901.
J. & W. TITUS.
LUBRICATOR FOR SHAFTING, &c.
(Application filed Feb. 18, 1901.)

(No Model.)

WITNESSES:

INVENTORS
John Titus
William Titus
BY
James A. Whitney
ATTORNEY

THE NORRIS PETERS CO., PHOTO-LITHO., WASHINGTON, D. C.

United States Patent Office.

JOHN TITUS, OF OYSTER BAY, AND WILLIAM TITUS, OF OLD WESTBURY, NEW YORK.

LUBRICATOR FOR SHAFTING, &c.

SPECIFICATION forming part of Letters Patent No. 689,522, dated December 24, 1901.

Application filed February 18, 1901. Serial No. 47,773. (No model.)

*To all whom it may concern:*

Be it known that we, JOHN TITUS, residing at Oyster Bay, and WILLIAM TITUS, residing at Old Westbury, in the town of North Hempstead, in the county of Nassau and State of New York, citizens of the United States, have invented certain new and useful Improvements in Lubricators for Shafting, &c.; and we do hereby declare that the following is a full, clear, and exact description of the same, reference being had to the accompanying drawings, making a part of this specification, in which—

Figure 1:
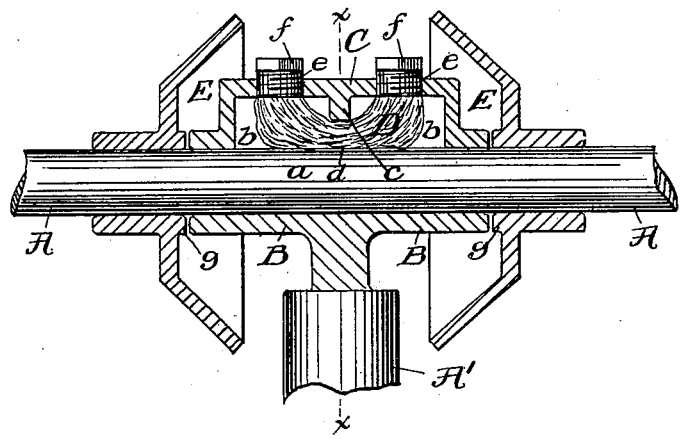
Figure 2:
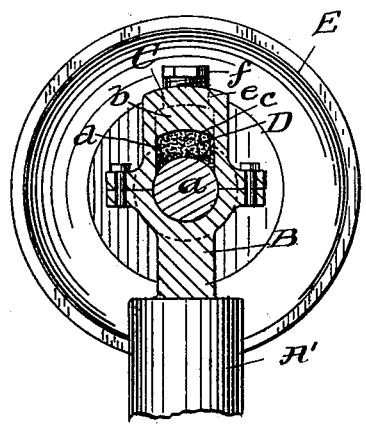

Figure 1 is a central longitudinal sectional view of a lubricator made according to our invention; and Fig. 2 is a transverse sectional view of the same, taken in the line $x\ x$ of Fig. 1.

This invention, while it may be used for general application to the lubrication of shafting, &c., is more especially intended for use under conditions in which the apparatus is exposed to dust, grit, and the like—as, for example, in connection with machinery for moving sand, earth, &c.—and its object is to provide a lubricating mechanism in which not only is provision made for the uniform and continuous lubrication of the shaft-journal, but the journal is also automatically protected from the intrusion of dust and grit, which, if suffered to occur, would to a greater or less extent counteract the action of the lubricant in providing for the smooth and non-frictional running of the journal in its box. These results we accomplish by certain novel combinations of parts comprised in our invention, and specifically set forth in the claims hereof.

A is a revoluble shaft of any preferred length and diameter.

B is the bearing or lower part of the journal-box, this lower half B being that which receives and supports the journal $a$ of the shaft and which is itself supported upon any suitable base A'. Placed upon this part B is a cap C, which constitutes the upper part of the journal-box and which is constructed with a chamber $b$, which when the cap is in place, as described, is situated above the journal portion $a$ of the shaft, as shown in the two figures of the drawings. This chamber is divided into two parts by a pendent partition $c$, there being a space between this partition which provides an opening $d$, by means of which the two parts of the chamber communicate with each other contiguous to the journal $a$, as more fully shown in Fig. 1. At the top of each of the two parts of the chamber $b$ is an opening $e$, which normally is closed by a removable screw-plug $f$. Drawn into the chamber $b$ through one of the openings $e$, thence through the opening $d$, and thrust upward to the opposite opening $e$ is a wick D, the position of which is such that for a substantial portion of its length its strands or fibers lie parallel, more or less, with the shaft, as indicated by the striated lines in Fig. 1. It will of course be observed that aside from the shaft the parts just above described are fixed or stationary, with the shaft arranged to revolve in due relation thereto.

Fast upon the shaft adjacent to each end of the journal-box is a flaring disk E, the hollowed side of which is toward the journal-box. The central part of each disk is contiguous to the adjacent end of the journal-box, and its flaring circumferential portion projects inward over the adjacent end of the journal-box, as shown in Fig. 1. These disks being fast upon the shaft of course revolve therewith in the active operation of the apparatus.

Preliminary to the operation of the apparatus the wick is saturated with oil or any suitable more or less liquid lubricant through the openings $e$ of the chamber $b$, said openings being then closed by the screw-plugs $f$. The wick being saturated as described and the fibers or strands of the wick lying parallel, or substantially so, with the shaft, a very much greater proportion of lubricating-surface is applied to the shaft than if the wick were in contact at the ends of its fibers with the journal-surface to be lubricated. The end portions of the wick may be arranged more or less vertical to facilitate the flow of lubricant along their length to the lower part of the wick, which being parallel with the shaft necessitates the flow of the lubricant to the surface to be lubricated in a direction transverse to the fibers of the wick, thereby somewhat retarding the flow to insure its more uniform supply along that part of the journal $a$ to which the lubricant is to be directly or immediately applied. Meanwhile the concavo-convex or flaring disks E, revolving with a speed proportioned to that of the shaft and being extended inward, over, or beyond the ends of the journal-box, any dust, sand, grit, or other similar substances which otherwise would enter between the journal and the journal-box or between the journal and the adjacent end of the cap is caught and whirled outward by centrifugal force, and thus prevented from entering, as just mentioned, with the result that the action of the lubricant in the wick and its inclosing chamber $b$ in reducing friction is not nullified or interfered with by any access of dust or the like to the journal. It is to be understood that in cases where only one end of the journal-box is exposed to the possible access of dust and grit only one disk may be employed. Where both ends are so exposed, two disks—one at each end, as shown in Fig. 1—are to be used.

What we claim as our invention is—

1. The combination with a revoluble shaft and a supporting journal-bearing, of a cap placed above said bearing to form the top of the journal-box and constructed with a chamber which is divided into two parts by a pendent partition, each part with an opening in its top normally closed by a plug, and the whole arranged to receive a lubricating-wick in substantially the manner herein set forth.

2. The combination with a revoluble shaft, a supporting journal-bearing, and a cap placed over said bearing and constructed with a chamber which is divided into two communicating parts by a pendent partition with an opening and plug to each part, of a flaring disk fast upon the shaft and contiguous to the end of the journal-box and with its flaring circumference extended over the said end of the journal-box to repel sand, grit, &c., from the joint between the journal and the journal-box, whereby a wick in the chamber is protected from access of such sand, &c., and the operation of the lubricating devices maintained unimpaired as described.

JOHN TITUS.
WILLIAM TITUS.

Witnesses:
JAMES H. LUDLAM,
ALBERT M. BAYLES.